United States Patent [19]
Ostertag

[11] Patent Number: 4,778,569
[45] Date of Patent: Oct. 18, 1988

[54] METHOD OF SEPARATION OF LIQUID MIXTURE OF SOLUTION BY POROUS SEPARATING WALL

[75] Inventor: Karl Ostertag, Erlenbach, Fed. Rep. of Germany

[73] Assignee: AKZO nv., Arnhem, Netherlands

[21] Appl. No.: 817,162

[22] Filed: Jan. 8, 1986

Related U.S. Application Data

[63] Continuation of Ser. No. 647,408, Sep. 5, 1984, abandoned.

[30] Foreign Application Priority Data

Sep. 24, 1983 [DE] Fed. Rep. of Germany ....... 3334640

[51] Int. Cl.$^4$ .............................................. B01D 3/00
[52] U.S. Cl. ........................................ 203/49; 203/91; 203/DIG. 9; 202/201; 159/DIG. 27; 159/DIG. 28
[58] Field of Search .............. 203/49, 91, DIG. 9; 202/201, 236; 159/DIG. 27, DIG. 28

[56] References Cited

U.S. PATENT DOCUMENTS

| | | | |
|---|---|---|---|
| 3,129,145 | 4/1964 | Hassler | 159/DIG. 27 |
| 3,129,146 | 4/1964 | Hassler | 159/DIG. 27 |
| 3,340,186 | 9/1967 | Weyl | 159/DIG. 27 |
| 3,406,096 | 10/1968 | Rodgers | 159/DIG. 27 |
| 3,562,116 | 2/1971 | Rodgers | 159/DIG. 28 |
| 3,563,860 | 2/1971 | Henderycky | 202/236 |
| 3,649,467 | 3/1972 | Winsel et al. | 203/49 |
| 3,878,054 | 4/1975 | Rodgers | 159/DIG. 27 |
| 4,265,713 | 5/1981 | Cheng | 159/DIG. 27 |
| 4,476,024 | 10/1984 | Cheng | 159/DIG. 27 |

FOREIGN PATENT DOCUMENTS 0039197 4/1980 European Pat. Off. .............. 203/10

OTHER PUBLICATIONS

Findley, "Vaporization Through Porous Membranes" Ultrafiltration, May 15-18, 1966, Alche, pp. 129-131.

Primary Examiner—David L. Lacey
Assistant Examiner—V. Manoharan
Attorney, Agent, or Firm—Michael J. Striker

[57] ABSTRACT

In a method and arrangement for separating a liquid mixture or a solution by converting a portion of the liquid mixture or portion of a solvent of the solution into a vapor phase and subsequent condensation of the obtained vapor with a porous separating wall, the pores of the porous separating wall are acted upon by a gas or gas mixture supplied through the pores of the porous separating wall in a counterstream to the vapor.

3 Claims, 2 Drawing Sheets

METHOD OF SEPARATION OF LIQUID MIXTURE OF SOLUTION BY POROUS SEPARATING WALL

This application is a continuation of application Ser. No. 647,408, filed Sept. 5, 1984, now abandoned.

BACKGROUND OF THE INVENTION

The present invention relates to a method of and an arrangement for separating a liquid mixture of a solution by converting a part of the liquid mixture or a part of the solvent of the solution in vaporous phase and subsequent condensation of the thus produced vapor, whereby the liquid mixture or the solution is brought in contact with (micro) porous separating wall with pores through which only the vapor can pass, but the liquid mixture or the solution cannot pass.

Presumption for conducting of this known process was that the porous separating wall is not wettable by the liquid mixture of the solution, or in other words is lyophobous or hydrophobous, since the pentration of liquid into the pores of the porous separating wall or a passage of the liquid through the porous separating wall must be prevented under all conditions. On these grounds, the above described methods were not suitable for such liquid mixtures or solutions which wet the porous separating wall in some conditions of the method. Moreover, the known method was performed so that the vapor transport through the pores of the porous separating wall is hindered as little as possible or not hindered at all by gas available in the pores, in other words remaining and/or entrained gas.

SUMMARY OF THE INVENTION

Accordingly, it is an object of the present invention to provide a method of and an arrangement for separating a liquid mixture or a solution by a porous separating wall, which avoid the disadvantages of the prior art.

More particularly, it is an object of the present invention to provide a method of and arrangement for separating a liquid mixture of a solution by a porous separating wall which are suitable for such liquid mixtures or solutions which wet the porous separating wall.

In keeping with these objects and with others which will become apparent hereinafter, one feature of the present invention resides, briefly stated, in a method in accordance with which the pores of a porous separating wall are acted upon with a gas or a gas mixture, and the gas or the gas mixture is supplied in a counter stream to vapor through the pores of the porous separating wall.

The driving force of the inventive method is the vapor pressure difference between the liquid mixture side or the solution side, and the distillate side of each pore of the porous separating wall. Such a vapor pressure difference is obtained by a corresponding concentration drop or obtained so that either the distillate vapor is continuously conveyed from the porous separating wall, or the distillate side of the porous separating wall is continuously acted upon with a liquid which has a lower temperature than the liquid mixture or the solution and takes the condensing distillate at the distillate side of the pores of the porous separating wall, by a temperature difference between the liquid mixture or the solution and the condensate. Advantageously, this cooling or dragging liquid is composed itself of condensated cooled distillate. In this way, an admixture of the distillate with another liquid is avoided. This is especially of a great advantage when the distillate itself is the method product.

The gas stream which characterizes the inventive method acts in advantageous manner by formation of a pressure difference between the distillate side and the liquid mixture or solution side, wherein the higher pressure is produced at the distillate side. Such a pressure difference can be obtained by formation of underpressure at the solution or liquid mixture side and/or by formation of over pressure at the distillate side. This is also true when the distillate side of the porous separating wall is acted upon with liquid, for example, condensed distillate. In this case, a sufficient gas stream through the pores of the porous separating wall can be obtained for example in such a manner that the gas or gas mixture, to which air or gas-air mixture also belongs, can be introduced in a sufficient quantity into a liquid (condensate) which is under a higher pressure than the liquid mixture or the solution to be separated.

For obtaining the gas stream through the pores of the porous separating wall, a gas or gas mixture can be used which remains inert to the liquid mixture or the solution to be separated and the distillate, and/or which is soluble only in a small quantity in the liquid with which it comes in contact. If desired, also such a gas can be used which causes changes of the liquid mixture or the solution or one of their components, for example, which chemically reacts with the same. The utilization of a gas whose solubility can be liquid used at the distillate side is very high, it has been noticed that a sufficient gas excess is provided and thereby sufficient undissolved gas remains in the fluid for obtaining the gas stream through the porous separating wall. Because of a high solubility of the used gas in the liquid mixture to be separated the gas stream through the porous separating wall is in some cases strengthened, that in some circumstances is of advantage.

The gas quantity which flows through the pores of the porous separating wall in counterstream to the vapor must not be selected for understandable reasons so great as to unnecessarily strongly hinder the vapor passage. Instead, it must be selected only so great as to avoid with the sufficient reliability the penetration of liquid (liquid mixture or solution). The gas quantity required for this depends on the dimension of the porous separating wall, the dimension of the pores, the total area of the pore cross-section areas, the wettability of the porous separating wall, the temperature, the type of the gas, and other material and process parameters. It can be determined in a simple manner. For example, for acting on the porous separating wall with the liquid to be treated any high gas stream can be used and after acting on the porous separating wall with the liquid and attaining the desired method parameter the gas stream is reduced by lowering the gas pressure until an insignificant liquid passage through the porous separating wall is obtained. It lies then within the judgement of the specialist by which amount to increase this no longer sufficient pressure to guarantee a reliable performance of the inventive method.

The inventive method can be performed so that the vapor which passes through the pores is condensed directly in the region of the porous separating wall. This can be attained in such a manner that the porous separating wall is acted upon at its distillate side with a liquid, particularly corresponding to the vapor condensate and having a temperature with which the vapor pressure difference acting in the inventive method is attained between the liquid mixture or solution side and the condensate side of each pore of the porous separating wall. Presumption for this type of performance of the method is that the liquid at the condensate side does not wet the porous separating wall.

It is also, however, possible, after discharge of the vapor from the pores of the porous separating wall to return the vapor or at least to convey the vapor through a chamber filled with a gas or gas mixture, or to allow the vapor to diffuse and to condense after this either on a cooled surface or to let it first to pass or diffuse through the pores of a second porous separating wall with pores through which in some cases a gas or gas mixture is supplied in a counter stream with or in a counter stream to the vapor and then to condensate it first at any location.

As mentioned hereinabove, the vapor pressure difference acting for evaporation can be obtained in many cases by a temperature difference between the solution or liquid mixture (warm side) and the distillate side (cold side). The porous separating wall acts in an advantageous manner additionally as a heat insulating layer, whereas with a horizontal arrangement of the porous separating wall and a flow guidance with a warm side located above the cold side, there is additional advantage in that a natural convection which distorts the vapor transport at the distillate side is completely prevented in the space limited on the porous separating wall and filled with a gas or gas mixture and the distillate vapor. Such a distorting convection takes place when a non-hindered heat or material exchange can take place between the upper surface of the solution or the liquid mixture and the vapor space, as is the case for example in conventional distillation containers or bells and especially in so-called fall film evaporators. In the event of acting on the distillate side of the porous separating wall with liquid, for example, condensed distillate, instead of the distillate vapor, there is the advantage in utilization of porous separating wall so that the diffusion path for the distillate vapor is relatively short and the required separating conditions for the liquid mixture or solution to be separated and condensate are guaranteed with high reliability over unlimited time.

For performing the method it is required that the boiling state takes place in the liquid mixture or the solution to be separated.

Though the inventive method is understandably suitable for such cases in which neither the solution or the liquid mixture nor the condensate wet the porous separating wall, it seems to be of less advantage since the gas stream directed oppositely to the vapor acts rather as a unnecessary hinderance for the vapor diffusion.

The vapor exiting the solutions is composed in general exclusively of a pure solvent, for example water, whereas the dissolved (solid) material is found in all cases in traces and practically completely remains in the solution.

This is however different for the liquid mixtures. In two-component liquid mixtures the exiting vapor is composed of, for example, two components. If one material has a lower boiling point than the other, this is as a rule the more volatile component.

When a vapor mixture is produced from such a liquid mixture, the concentration of the volatile material in the vapor phase is in general higher than the residual liquid mixture remaining in the liquid phase, or in other words, it is enriched there. When this vapor is condensed, a liquid mixture is obtained which has the same composition as the vapor, or in other words, in which the volatile material is also enriched. This condition for the liquid mixtures provides for a possibility to decompose or separate the liquid mixture containing fraction with different composition, by a repeated distillation into its components. This type of separation of liquid mixture is in general known as fractioning distillation and in the event of continuous process as rectification. A liquid mixture with which the composition or the other portion of each of its components in the mixture vapor emerging from the mixture is the same as in the mixture is called an azeotropic mixture. Such a mixture cannot be decomposed by distillation in its pure components or in fractions with other compositions. The composition in the respective upper phase can be changed, however, in each case by changing the pressure or the temperature.

The graphic representation of the vapor concentration over the liquid concentration is known in general as McCabe-Thiele diagram. It can be obtained by measurements or calculations. The methods to do this are known for example from the following publications:

E. Kirschbaum, Destiller- und Rektifiziertechnik, Springer-Verlag 1960; Lueger, Lexikon der Technik, Deutsche Verlagsanstalt Stuttgart 1960, Volume I, see "Azeotroper Punkt" and "Rektifikation", Volume IV, see "Destillation" and Volume 16, see "McCabe-Thiele-Diagram", "Rektifikation", "Rektifikation mit Hilfsstoffen", "Rektifizierapparat" and "Siedegleichgewicht"; similarly Ullmans Encyklopaedie der technischen Chemie, Verlag Chemie Weinheim/Berstrasse, Volume 1, Allgemeine Grundlagen der Verfahrens- und Reaktionstechnik 1972, Volume 2 Verfahrenstechnik I (Grundoperationen) 1972 and Volume 3 Verfahrenstechnik II und Reaktionsapparate 1973.

It has been found surprisingly that in the inventive method with liquid mixtures a vapor composition deviating from the equilibrium conditions can be used, or in other words, another equilibrium curve can be obtained in the McCable-Thiele diagram than during conventional distillation without the opposite gas stram. This means that it is possible thereby in an advantageous manner to separate with the inventive method also such mixtures in a simple way which exhibit in the event of the utilization of the method parameters (pressure, temperature) conventional azeotropic condition, since the distillate produced here has another composition than the remaining liquid mixture (residual). Both produced mixture fractions of the original liquid mixture can be decomposed then for example with conventional distillation or rectification method.

Liquid mixture which exhibits during the inventive method azeotropic conditions can be separated in general by conventional methods. This can be explained as follows:

When one determines for the two component liquid mixture in a conventional manner the vapor composition (vapor concentration) for different mixture compositions (liquid concentrations) or the so-called McCabe-Thiele diagram and one handles a mixture composition with azeotropic condition, then a further mixture composition is obtained with which only in the inventive method azeotropic take place.

The azeotropic point which takes place in conventional distillation or rectification methods can thereby be bypassed and reversed with the inventive method.

The feature that with the utilization of the inventive method the distillate has a different composition than with the utilization of conventional methods, can be used in certain circumstances in an advantageous manner so that the base number in rectification columns to be reduced when with the inventive method two mixture fractions are obtained, which can be attained in conventional methods first after several steps.

In the inventive method as compared with the conventional distillation methods, the enrichment of the volatile mixture components is superposed by an enrichment of such components which have the lower molecular weight. This has the result that for example in the event of a mixture of water and a low boiling alcohol, the conventional enrichment of the alcohol in vapor and the condensate formed therefrom takes place in the inventive method in a less expressed quantity. In other words, the condensate produced in the inventive method contains relatively less alcohol than the alcohol which is produced with the same temperature and pressure conditions without the inventive opposite gas stream. With a liquid mixture in which the volatile components also have the low molecular weight, a stronger enrichment of this component must be obtained in the inventive method.

Liquid mixture or solution in the sense of the present invention include also acids, liquids containing organic or inorganic particles in unsolved formed, also in a submicroscopic region, microorganisms and the like, extracts, emulsions and the like. The inventive method is suitable for treating all such liquids in which under the abovementioned conditions at least a partial separation of at least one component of this liquid takes place. The desired end product can be a concentrated solution or a liquid freed from at least one component completely or partially and/or a vaporous or condensed distillate.

The separating wall suitable for performance of the inventive method can have a flat shape or a non-flat shape, for example, curved, waved or closed shape; it can also be for example plate shaped, hose shaped, pipe shaped or formed by hollow threads or hollow fibers. Several such bodies can also form the porous separating wall. The hollow separating wall can also be formed as at least one tubular or hollow thread bundle. The porous separating wall suitable for performance of the inventive method can be composed of a metallic or non-metallic material such as ceramics, asbestos, silicates, mineral materials, cellulose, cellulose acetate, nylon, polypropylene, polytetrafluoroethylene, polyethylene, polyvinylidene fluoride, polyvinylchloride and their mixtures.

Also artificially produced porous or microporous membranes can be used as the porous separating wall, which can be formed as flat membrane (flat foil), hose membranes (hose foil), pipe or hollow fiber or hollow thread.

The liquids used in the inventive method can move and/or flow substantially quietly or through agitating devices. Also here the conventional flow form can be used, such as direct flow, opposite flow, cross flow or any mixed flow produced therefrom, which is considered as advantageous.

The heating or cooling of liquids, vapor or gas, required in some cases in the inventive method, can be provided in the region of the porous separating wall, or also in any other place. It is also possible to have at least partial recovery of the heat released by the condensation of the distillate vapor, for example for heating the liquid mixture or the solution. For this purpose heat pumps can be used.

The inventive method can be performed in several steps. In other words, the residue produced in one stage (concentrated solution or liquid mixture depleted of volatile component) and/or the condensed distillate can be again subjected in a subsequent step through the inventive method. Moreover, it can be used as preceding, intermediate or final stage of any other conventional method. This is especially true when the inventive method is used for bypassing of the azeotropic point of a liquid mixture.

The inventive arrangement which is suitable for conducting the inventive method includes substantially a container, a porous separating wall which subdivides the container into two chambers, wherein one chamber serves for receiving the liquid mixture or the solution and the other chamber serves for receiving the distillate vapor or liquid (condensated) distillate (condensate), and has in accordance with the invention a device for supplying gas to the chamber for receiving the distillate discharged from the porous separating wall.

In accordance with a further feature, the container of the inventive arrangement is subdivided by two or more porous separating walls in three or more successively arranged chambers.

Moreover, at least one chamber of the inventive arrangement can be connected with a device for producing underpressure or overpressure and/or can have tubular conduits for supplying or withdrawing liquids, vapors or gases employed in the inventive method. All parts of the inventive arrangement operating with underpressure or overpressure have an outwardly closed shape.

The inventive arrangement can be, further, provided with measuring, controlling and monitoring devices which are known to the experts and available in any type. The same is true for the required supply means for desired, in some cases, supply or withdrawal of the liquids, vapors and gases used in the method.

The inventive arrangement can be formed so that the solution or the liquid mixture and/or the condensate can be advanced through the porous separating wall once or many times, in a cycle, or passed through the respective chambers, and only partial stream of the circulating quantities obtained in this manner are supplied or withdrawn.

The devices for heating and/or cooling the liquids, vapors and gases used in the inventive method can be arranged inside or outside of the respective chambers provided therefor.

The inventive arrangement can be composed or several chambers connected in parallel for the individual liquids, vapors or gases of the method, so that they are connected in a tubular bundle.

Also, agitating devices can be arranged in the chambers when, for example, the repumping of a liquid is considered as not advantageous.

The porous separating wall of the inventive arrangement is formed as explained hereinbelow in the description of the inventive method. The size of the inventive arrangement has no limits within the frame of conventional dimensions.

The novel features which are considered as characteristic for the invention as set forth in particular in the appended claims. The invention itself, however, both as to its construction and its method of operation, together with additional objects and advantages thereof, will be

DESCRIPTION OF PREFERRED EMBODIMENTS

Figure 1:
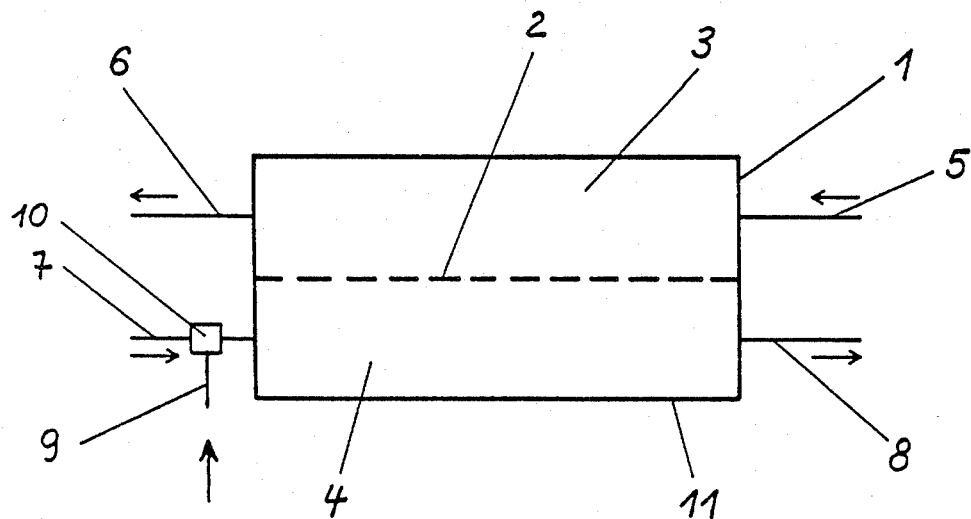
FIG. 1 is a view schematically showing an inventive arrangement for separating liquid mixtures or solutions, with a porous separating wall.

An arrangement for separating a liquid mixture or a solution shown in FIG. 1 has a container identified with reference numeral 1 and subdivided by a porous separating wall 2 into a first chamber 3 for receiving a liquid mixture or a solution, and a second chamber 4 for receiving a distillate vapor or liquid (condensated) distillate. The container 1 is provided with supply conduit 5 and a withdrawal conduit 6 for the liquid mixture or the solution, a supply conduit 7 and a withdrawal conduit 8 for distillate vapor or liquid (condensated) distillate or another fluid. Finally, the container 1 is provided, in accordance with the present invention with a supply conduit 9 for gas and a mixing device 10 for distributing the gas in the liquid which is supplied in this manner subsequently into the chamber 4.

For conducting the inventive method, the chamber 4 can be filled completely or partially with liquid, for example distillate. The liquid which provides condensation of the vapor diffused through the pores of the porous separating wall 2 can be supplied to the chamber 4 with the respectively lower temperature. It is, however, also possible to withdraw heat from the chamber 4. It is also possible to cause condensation of the vapor on a container wall 11 by cooling of this wall. In the last case and also when the distillate vapor must be withdrawn from the chamber 4, the supply conduit 7 can be connected with a not shown blocking element arranged for the mixing device 10. The supply of the gas into the chamber 4 is thereby not interrupted. In dependence upon the running mode, a part of the gas supplied to the chamber 4 can be withdrawn through the withdrawal conduit 8.

With the use of a non-wettable liquid for condensation of the vapor discharged from the pores of the porous separating wall 2, the chamber 4 can be filled partially and also completely. In the latter case, the liquid can unobjectionably contact the porous separating wall 2. With the use of a cooling liquid which wets the porous separating wall 2 it must not contact the porous separating wall 2. This means that between the liquid surface and the porous separating wall 2, an intermediate space filled with vapor or gas must be formed.

Figure 2:
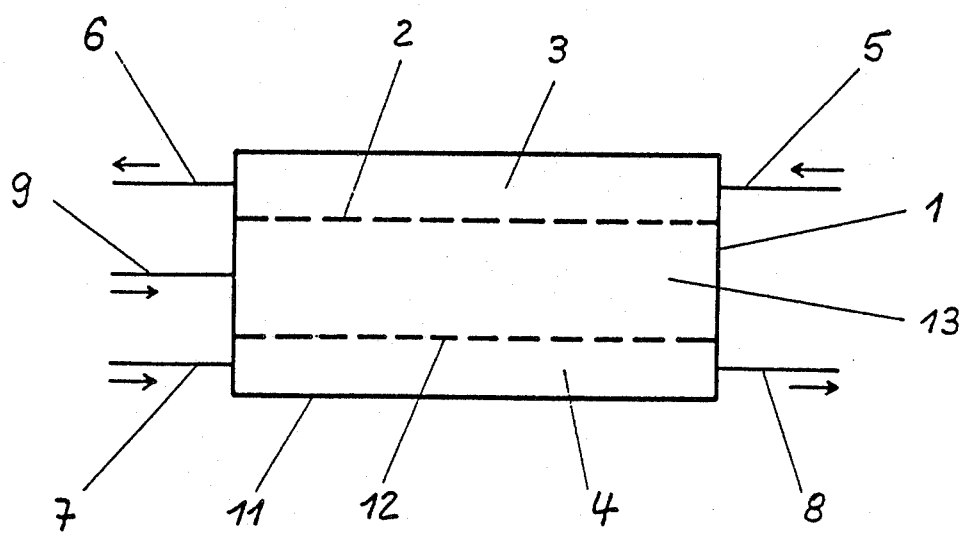
FIG. 2 is a view showing the inventive arrangement in accordance with another embodiment, with two porous separating walls.

The arrangement for separating a liquid mixture or a solution in accordance with the embodiment shown in FIG. 2, has a container 1 which is subdivided by a first porous separating wall 2 and a second porous separating wall 12 into a first chamber 3 for receiving the liquid mixture or the solution, a second chamber 13 for receiving the gas and the distillate vapor, and a third chamber 4 for receiving the distillate vapor or liquid (condensated) distillate. It also has the supply conduit 5 and the withdrawal conduit 6 for the liquid mixture or the solution, the supply conduit 9 for supplying gas to the chamber 13, and a supply conduit 7 and a withdrawal conduit 8 for the distillate vapor or liquid (condensated) distillate. In the arrangement in accordance with this embodiment the distillate vapor is condensated by contact with the porous separating wall 2, and after this it is diffused through the pores of the porous separating wall 12. In other aspects the action of the fluid in the chamber 4 is the same as for the chamber 4 in the arrangement shown in FIG. 1. In dependence upon the running mode, the gas supply to the chamber 13 can be allowed to pass only through the pores of the porous separating wall 2, or its part can also pass through the pores of the porous separating wall 12.

The arrangement in accordance with the abovedescribed embodiments are suitable particularly for liquid mixture or solutions wetting the porous separating wall 2, with which also the condensated distillate wets the porous separating wall 2.

Figure 3:
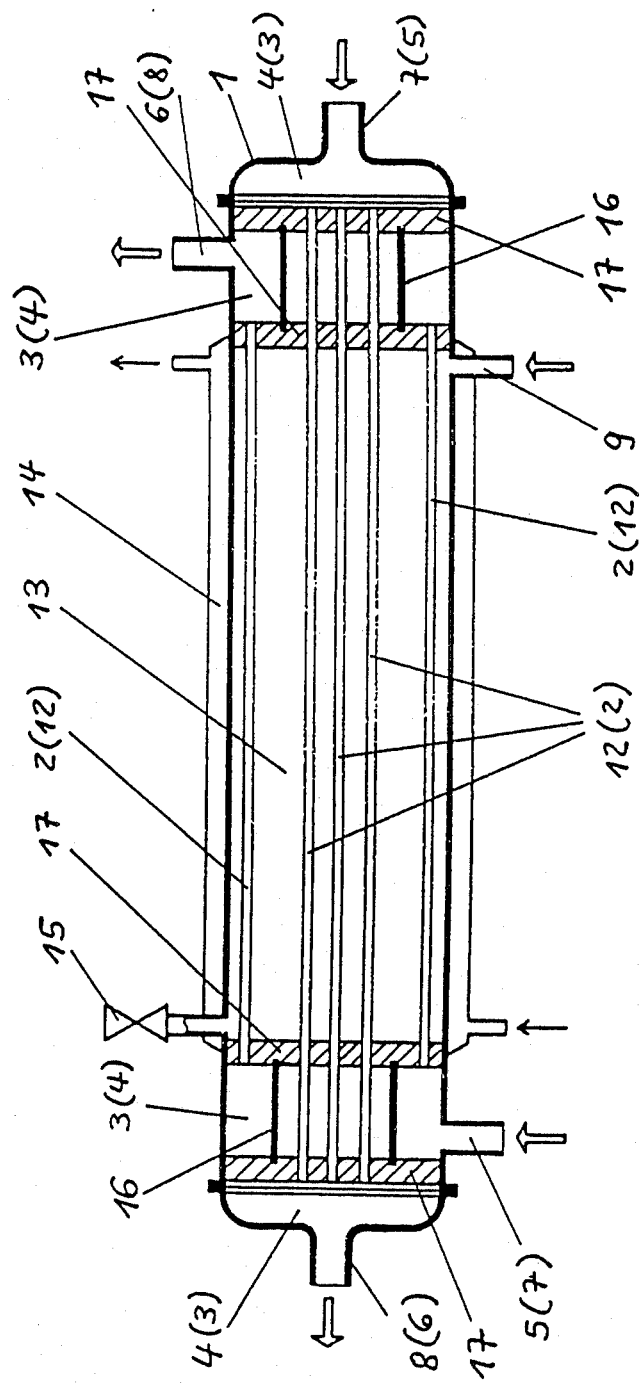
FIG. 3 is a view showing the inventive arrangement in accordance with still a further embodiment with a tubular porous separating wall.

The arrangement for separating a liquid mixture or a solution in accordance with the embodiments shown in FIG. 3 corresponds in principle to the embodiment of FIG. 2. Here the porous separating wall 2 and the porous separating wall 12 are formed by pipes. The pipes which form both porous separating walls 2 and 12 are arranged concentrically relative to one another. All other parts of this arrangement correspond to the respective parts of the arrangement of FIGS. 1 and 2. Moreover, the arrangement shown in FIG. 3 has a double jacket 14 which is used for heating or cooling of the chamber 13. The chamber 13 can be closed in a fluid-tight manner by a valve 15 or connected with not shown devices. When the supply conduit and the withdrawal conduit for the liquid mixture or the solution and the distillate are exchanged, the vapor transport is performed in the reverse direction. The functions of the chambers and the porous separating wall change respectively as illustrated in FIG. 3 by the reference numerals in round bracket. The remaining parts 1, 9, 13, 14 ad 15 retain their functions.

The horizontal position of the porous separating walls shown in FIGS. 1-3 is not completely necessary. However, it operates in an advantageous manner since a natural convection which distorts a vapor transport through the chamber 13 or 4 is continuously avoided.

A liquid-impermeable separating wall 16 which forms an annular chamber in FIG. 3, prevents a contact of the liquid located in the chamber 3 (or 4) with the pipes 12 (2) which form the porous separating wall. This is especially required when the liquid located in the chamber 3 (4) can lead to wetting of the pipe 12 (2) and thereby in some cases to a return mixing with the liquid flowing through the pipe 12 (2). Tubular bottoms 17 which are conventional for example also in tubular bundle heat exchangers from the fluid-tight separating walls between the chambers 3 (4), 4 (3) and 13.

It will be understood that each of the elements described above, or two or more together, may also find a useful application in other types of constructions differing from the types described above.

While the invention has been illustrated and described as embodied in a method of and arrangement for separating a liquid mixture or a solution it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapte it for various applications without omitting features that, from the standpoint of prior art, fairly constitute essential characteristics of the generic or specific aspects of this invention.

What is claimed as new and desired to be protected by Letters Patent is set forth in the appended claims.

1. A method of separation of a liquid mixture or a solution, comprising the steps of bringing a liquid mixture or a solution into contact with a porous separating wall at its one side; converting a portion of the liquid mixture or a portion of a solvent of the solution into a vapor phase so that the vapor passes through the pores of the separating wall from its one side to its other side; acting upon the pores of the porous separating wall with a gas or gas mixture by supplying the gas or gas mixture through the pores of the porous separating wall in counterstream to the vapor so that a higher pressure is formed at the other side of the separating wall causing the converting and the vapor can pass while the liquid mixture or the solution cannot pass through the pores of the separating wall and so that the vapor transport through the pores is not hindered by any gas remaining or entrained in said pores; condensing the vapor at the other side of said separating wall; and diffusing the vapor discharged from the pores of the separating wall, prior to the condensing through a chamber filled by a gas or gas mixture.

2. A method as defined in claim 1; and further comprising a step of diffusing the vapor prior to said condensing step through at least one further porous separating wall.

3. A method as defined in claim 2; and further comprising the step of passing through the pores of said further porous separating wall a gas or gas mixture in counterstream to the vapor.

* * * * *